(12) United States Patent
Renault et al.

(10) Patent No.: US 10,149,491 B2
(45) Date of Patent: *Dec. 11, 2018

(54) STABILISATION OF NATURAL DYES BY AN ACEROLA POWDER

(71) Applicant: DIANA NATURALS, Antrain (FR)

(72) Inventors: Emilie Renault, Le Rheu (FR); Delphine Laroque, Rennes (FR)

(73) Assignee: Diana Naturals, Antrain (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/655,598

(22) PCT Filed: Dec. 26, 2013

(86) PCT No.: PCT/EP2013/078022
§ 371 (c)(1),
(2) Date: Jun. 25, 2015

(87) PCT Pub. No.: WO2014/102304
PCT Pub. Date: Jul. 3, 2014

(65) Prior Publication Data
US 2015/0359254 A1    Dec. 17, 2015

(30) Foreign Application Priority Data

Dec. 26, 2012 (FR) .................... 12 62799

(51) Int. Cl.
*A23L 2/385*  (2006.01)
*A23L 3/3454* (2006.01)
(Continued)

(52) U.S. Cl.
CPC ............ *A23L 3/3454* (2013.01); *A23L 2/385* (2013.01); *A23L 5/43* (2016.08); *A23L 5/51* (2016.08);
(Continued)

(58) Field of Classification Search
CPC .... A61K 2300/00; A61K 31/375; A61K 8/97; A61K 9/14; A61K 2800/43;
(Continued)

(56) References Cited

U.S. PATENT DOCUMENTS 3,012,942 A * 12/1961 Morse ................ A61K 31/375
                                                435/267
4,664,920 A *  5/1987 Saleeb ..................... A23L 2/39
                                                426/250
(Continued)

FOREIGN PATENT DOCUMENTS

JP       S60-234554       11/1985

OTHER PUBLICATIONS

Burdock, George A., Ph.D., Encyclopedia of Food and Color Additives, vol. II, CRC Press Inc., 1997, p. 1617.*
(Continued)

*Primary Examiner* — Hong T Yoo
(74) *Attorney, Agent, or Firm* — Workman Nydegger

(57) ABSTRACT

The invention concerns a powder consisting of 0.5 to 8% by weight of water and a dry material consisting of 88 to 95% by weight of an acerola fruit dry extract and 5 to 12% by weight of magnesium, calcium, zinc, sodium or potassium hydroxide or carbonate, the method of preparing same and the applications thereof for stabilizing a natural dye.

9 Claims, 3 Drawing Sheets

(51) Int. Cl.
*A23L 5/00* (2016.01)
*A23P 10/40* (2016.01)
*A23L 19/00* (2016.01)
*A23L 5/43* (2016.01)
*A23L 33/105* (2016.01)
*A23L 33/15* (2016.01)
*A23L 33/16* (2016.01)

(52) U.S. Cl.
CPC .............. *A23L 19/01* (2016.08); *A23L 33/105* (2016.08); *A23L 33/15* (2016.08); *A23L 33/16* (2016.08); *A23P 10/40* (2016.08); *A23V 2002/00* (2013.01)

(58) Field of Classification Search
CPC ............ A23V 2002/00; A23V 2250/21; A23V 2200/30; A23V 2250/70; A23L 33/105; A23L 2/52; A23L 2/02; A23L 33/15; A23L 33/16
See application file for complete search history.

(56) References Cited

U.S. PATENT DOCUMENTS

2004/0161523 A1* 8/2004 Nair ....................... A61K 36/45
426/640

2012/0014934 A1* 1/2012 Altaffer .................. A61K 31/05
424/94.1
2014/0348925 A1* 11/2014 Saura Calixto ......... A23L 19/09
424/489

OTHER PUBLICATIONS

Salunkhe, D.K. and S.S. Kadan, Handbook of Fruit Science and Technology Production, Composition, Storage and Processing, Marcel Dekker, Inc. 1995, pp. 564.*

Simopoulos, A.P. and G. Gopalan, Plants in Human Health and Nutrition Policy, Karger, 2003, pp. 67, 70, 72-75.*

International Search Report and Written Opinion dated Feb. 20, 2014, issued in PCT Application No. PCT/EP2013/078022, filed Dec. 26, 2013.

A.S. Huang and J.H. Von Elbe, *Effect of pH on the Degradation of Regeneration of Betanine*, Journal of Food Science, vol. 52, No. 6, 1987, XP-002712078, pp. 1689-1693.

Tatiana Mezadri et al., *Carotenoid Pigments in Acerola Fruits (Malpighia emarginata DC.) and Derived Products*, European Food Research and Technology, vol. 220, No. 1, 2005, XP019328002, pp. 63-69.

* cited by examiner

| Ingredient and proportion in the sausage application | L*a*b* measurements after heating | | | Photographs | RGB estimate | Carmine ΔE |
|---|---|---|---|---|---|---|
| | L* | a* | b* | | | |
| Without dye | 65.54 | 8.80 | 14.66 | 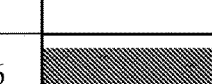 | (181; 152; 133) | 15.1 |
| 0.5 % red beet concentrate | 52.48 | 23.78 | 15.29 | 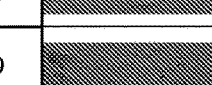 | (169; 108; 99) | 7.2 |
| 0.01 % carmine | 57.32 | 20.85 | 10.83 | 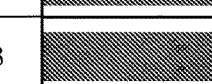 | (176; 124; 120) | 0 |
| 0.5 % red beet concentrate + 0.2 % powder of the invention | 53.81 | 20.94 | 9.78 | 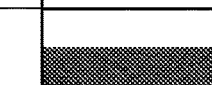 | (165; 114; 112) | 3.7 |
| 0.5 % red beet concentrate + 0.05 % powder of the invention | 56.17 | 19.32 | 12.16 | No photograph taken | (173; 122; 114) | 2.3 |
| 0.5 % red beet concentrate + 0.02 % powder of the invention | 54.46 | 19.55 | 10.23 | No photograph taken | (166; 117; 113) | 3.2 |

Fig. 5

STABILISATION OF NATURAL DYES BY AN ACEROLA POWDER

BACKGROUND

Acerola (*Malpighia punicifolia* L., synonymous with *Malpighia glabra* L., or *Malpighia emarginata* DC.) is a tree whose fruit is called Barbados cherry or Antilles cherry because it closely resembles the cherry.

A small tree (or shrub) with persistent foliage of the Malpighiaceae family, acerola grows spontaneously in tropical regions of South America, in particular in Peru and in the Amazon forests of Brazil and Venezuela. It is also present in the Antilles, where it is called wild cherry.

Acerola fruit contains 20 to 30 times more vitamin C than orange. This makes it one of the fruits richest in vitamin C (1000 mg to 2000 mg/100 g), after *Terminalia ferdinandiana* fruit (50 times richer than orange) and that of camu-camu (*Myrciaria dubia*) (30 to 40 times richer than orange). It is also rich in vitamin B6, vitamin B1 and vitamin A, and in flavonoids and minerals (iron, calcium, phosphorus, potassium and magnesium).

The trend towards the "natural" is well established in the food products, nutraceuticals and cosmetics markets. Naturalness is one of the keys of the success of commercial launches of products appearing on the market in recent years, all the more so in a context where the consumer now clearly perceives the risks associated with ingestion of synthetic compounds and where the laws governing the scope of the use of food additives have become more strict, as witnessed, for example, by the proposed changes to permitted additives listed in Regulation (EC) No 1333/2008 of the European Parliament and of the Council. The "clean label" nature of consumer goods is a decisive element in the purchasing act, and formulating products free of any substance unfamiliar to housewives is a great challenge that the above-mentioned industries seek to overcome.

Efforts to develop so-called "natural" products appear on every level, and concern both the design of final products and the ingredients sector. More particularly, formulation experts clearly express a need for the development of natural dyes, whether additives or ingredients. However, it is recognised today that natural alternatives to synthetic dyes are less stable in terms of the heat, light and pH changes to which food products are subjected. Concentrates of red beet, a vector of betanin pigments, are natural red dyes par excellence suited to applications where pH is close to neutral. However, their stability comes into question when they are subjected to heating steps. This stabilisation is possible by the use of chelators such as EDTA or antioxidants, but this solution does not meet current demand for natural and "clean label" substances.

There is a need, therefore, for "natural" compounds for stabilising natural pigments such as betanin.

SUMMARY OF THE INVENTION

The Inventors have now discovered that an acerola juice concentrate powder containing magnesium hydroxide can stabilise betanin pigments. Notably, this stabilisation compound is natural. Moreover, this product has the advantage of being in a powder form that is easy to use in food-processing formulations and the advantage of limiting acidification of the product.

Consequently, a first subject matter of the invention concerns a powder consisting of 0.5% to 8% by weight of water, and dry material consisting of 88% to 95% by weight of an acerola fruit dry extract, and 5% to 12% by weight of a hydroxide or carbonate of magnesium, calcium, zinc, sodium or potassium.

Preferably, the dry material of the powder of the invention consists of 90% to 94% by weight of an acerola fruit dry extract and 6% to 10% by weight of a hydroxide or carbonate of magnesium, calcium, zinc, sodium or potassium, preferably a hydroxide of magnesium.

By "acerola fruit dry extract" is meant the dry material of a product resulting from the drying of an acerola fruit juice, preferably a juice concentrate, that is, 10 to 70° Brix, preferably 45 to 55° Brix. Preferably, said juice concentrate has a vitamin C content of 3% to 24%, preferably of 15% to 21%. Preferably, said juice concentrate has an acidity of 800 to 2200 meq/kg, preferably of 1200 to 1800 meq/kg. Preferably, said juice concentrate has a pH of 2.5 to 4, preferably of 3 to 3.6.

The powder of the invention is characterised by its high vitamin C content.

Preferably, it is 30% to 40% by weight of vitamin C relative to the total weight of the powder, in a particularly preferred manner 30% to 36%, in particular 34%±3%, preferably it is 34%±2% (vitamin C analysis is carried out by reversed-phase HPLC on a Spherisorb ODS2 column or equivalent, the analysis procedure being described in European standard NF EN 14130).

The high vitamin C content of the powder according to the invention has a key importance in the nutraceuticals field, since it makes it possible to administer the recommended daily amount in a pharmaceutical form of suitable size. Moreover, in the foodstuffs industry (in particular in cooked meats), the powder of the invention, because of its high vitamin C content, can be used in a sufficiently small amount in order to limit the negative side effects associated with the incorporation of high proportions of acerola (such as acerola's taste and acidity), while providing a satisfactory amount of vitamin C in a small space (advantageous when the powder must be used in a composition of various components with limited space).

The powder of the invention features a pH range of 4 to 8. Preferably, the powder of the invention has a pH of about 4.5 to 6 (pH measured on a 10% solution in water). The lower bound of 4.5 is the pH below which it is advised not to go in order to guarantee a sufficient amount of the basic form of the ascorbic acid/ascorbate pair and to facilitate drying, even if at pH 4 to 4.5 drying remains feasible. The upper bound of 6 is a pH above which a false and undesirable "soap"-type taste may develop. However, pH values of 6 to 8 may be used if the final application is able to conceal the organoleptic defects which may develop.

Preferably, the powder of the invention comprises less than 5% by weight of water, preferably 1% to 3%.

Another subject matter of the invention concerns a method for the preparation of the powder according to the invention comprising the following steps:
 (i) mixing acerola fruit juice; a hydroxide or carbonate of magnesium, calcium, zinc, sodium or potassium; and water,
 (ii) drying to a water content of less than 8% by weight, and
 (iii) screening.

The powder of the invention is obtained by mixing acerola fruit juice, preferably concentrated; a hydroxide or carbonate of magnesium, calcium, zinc, sodium or potassium and water in selected proportions in order to allow effective drying while maximising vitamin C content.

The acerola fruit dry extract is thus present in the powder of the invention in a proportion of 88% to 95% by weight of the dry weight of the mixture.

The hydroxide or carbonate of magnesium, calcium, zinc, sodium or potassium is present in the acerola fruit juice/hydroxide or carbonate/water mixture in a proportion of 5% to 12% by weight of the dry weight of the mixture.

This amount may also be defined as a function of pH. It allows the acerola fruit juice/hydroxide or carbonate/water mixture to reach a pre-drying pH of preferably between 4.5 and 5.

As shown in FIG. 2, magnesium, calcium, zinc, sodium or potassium hydroxide or carbonate levels below 5% lead to a loss of drying efficiency and of yield. Similarly, magnesium, calcium, zinc, sodium or potassium hydroxide or carbonate levels above 12% lead to the appearance of a "soap" taste unsuited for use in food processing and to a decrease in vitamin C content resulting from a lower proportion of acerola fruit dry extract.

The amount of water of the acerola fruit juice/hydroxide or carbonate/water mixture is adjusted in order to obtain a 20 to 35° Brix mixture, preferably 30° Brix.

This mixture is then dried, preferably by spray drying or vacuum drying or any other means that guarantees that a completely soluble product will be obtained. Certain conventional methods used in the context of the manufacture of dry products, such as freeze-drying, for example, are likely to produce powders of granular or heterogeneous appearance that are associated with the generation of turbidity or insolubles after dissolution. This is shown in Example 1. Obtaining an especially soluble powder allows better release of the vitamin C and the other active components of acerola fruit and thus better application efficacy, which will broaden the application spectrum of the powder to numerous foods or food compositions. Conversely, obtaining a powder having lower solubility has consequences for the application potential of this powder, which cannot be incorporated into certain products homogeneously or without modifying the texture thereof.

The powder obtained is then screened, packaged and stored.

An acerola (*Malpighia punicifolia* L. or *Malpighia glabra* L. or *Malpighia emarginata* DC.) fruit juice concentrate is typically used as the raw material to design the powder of the invention. However, the method used to obtain the powder of the invention may also include the step of manufacturing acerola fruit juice concentrate by grinding and pressing acerola fruits and then concentrating the juice thus extracted according to conventional methods for obtaining plant juice concentrates, in particular including steps such as cooking, pasteurisation, decanting, centrifugation, filtration and ultrafiltration, enzyme treatment, fermentation, etc. These steps, in particular the enzyme treatment and fermentation steps, may improve the properties of the powder according to the invention, such as sensory profile or vitamin C content. In an optimal embodiment of the method, the raw material used is an acerola fruit clarified juice concentrate of about 45 to 55° Brix, preferably 50° Brix, with a vitamin C content of about 17% (15% to 21%, more broadly), acidity of 1200 to 1800 meq/kg and pH of about 3.5 (3 to 3.6, more broadly).

The optionally-concentrated acerola fruit juice is stored in frozen form so as to limit loss of vitamin C.

Another subject matter of the invention concerns a food additive or ingredient comprising a powder according to the invention.

Preferably, the food additive or ingredient of the invention further comprises a natural dye comprising one or more natural pigments, in particular betanin.

Preferably, the food additive or ingredient of the invention comprises as natural dye a red beet juice concentrate or a red beet powder.

The powder of the invention stabilises natural dyes such as betanin.

Preferably, the powder of the invention stabilises dyes obtained from red beet.

The Inventors discovered, surprisingly, that an acerola extract alone stabilises dyes obtained from red beet, in particular betanin. Even more surprisingly, the Inventors discovered that the powder of the invention stabilises dyes obtained from red beet, in particular betanin, better than an acerola extract alone. FIG. 3 clearly shows that the acerola extract/magnesium hydroxide combination corresponding to the powder of the invention stabilises betanin better than the acerola alone and that magnesium hydroxide has a negligible effect on betanin stabilisation. The powder according to the invention thus has a specific effect on betanin stabilisation that does not result from a simple additional effect of the positive effect of the acerola extract alone and of the negligible effect of magnesium hydroxide.

The Inventors also discovered that the powder according to the invention involves more than the ascorbic acid content thereof, despite the high proportion in the powder of the invention. Indeed, it has a positive dose-effect that allows more effective stabilisation of betanin pigment. FIG. 4 shows that the effect on betanin stabilisation increases as the concentration of the powder of the invention increases, whereas it decreases with increasing amounts of ascorbic acid.

Natural dyes stabilised by the powder of the invention are used to dye meats, in particular heat-treated processed meat products (frankfurter-type sausages, etc.), milk-based beverages (milkshake, etc.), instant beverages, acidic dairy beverages, sweets (coated sweets, hard sweets, marshmallows, etc.), yogurts (incubated, blended, etc.), cakes, biscuits, decorative pieces, toppings.

Another subject matter of the invention concerns a food or food composition comprising a food additive or ingredient according to the invention. Preferably, this food or food composition is a heat-treated processed meat product (frankfurter-type sausage, etc.), a milk-based beverage (milkshake, etc.), an instant beverage, an acidic dairy beverage, a sweet (coated sweet, hard sweet, marshmallow, etc.), a yogurt (incubated, blended, etc.), a cake, a biscuit, a decorative piece, a topping.

Another subject matter of the invention concerns the use of a powder according to the invention to stabilise a natural dye comprising one or more natural pigments, in particular betanin.

BRIEF DESCRIPTION OF THE DRAWINGS

FIG. 5 presents Table 3: Analyses of the colour obtained in a "cooked meats" food model after incorporation or not of dyes, alone or stabilised.

DETAILED DESCRIPTION

Examples

Example 1—Production and Solubilisation Properties of a Powder According to the Invention i. Production of a Powder According to the Invention

Taking into account the features of the acerola fruit juice concentrate employed (50° Brix, 17% vitamin C), the pH of the mixture was stabilised at 4.5 with 92% acerola fruit juice concentrate and 8% magnesium hydroxide (percentages expressed relative to the dry material).

The amount of water to be added was then calculated so as to obtain a ° Brix value for the acerola fruit juice concentrate/magnesium hydroxide/water mixture of 30° Brix.

Consequently, the following formulation was prepared according to the method below:

| Raw material | Recipe (% of dry material) | pH | Amount employed (kg) |
|---|---|---|---|
| Acerola fruit juice concentrate | 92 | 3.01 | 420 |
| Magnesium hydroxide | 8 | 14 | 15 |
| Water | — | 7.61 | 300 |

The materials were mixed in a vat and the mixture was spray-dried (inlet temperature 160° C., outlet temperature 86-88° C.). The powder was screened with a 650 μm mesh and packaged in aluminium bags.

The yield obtained is 73.5% and productivity is about 84 kg/h.

Figure 1:
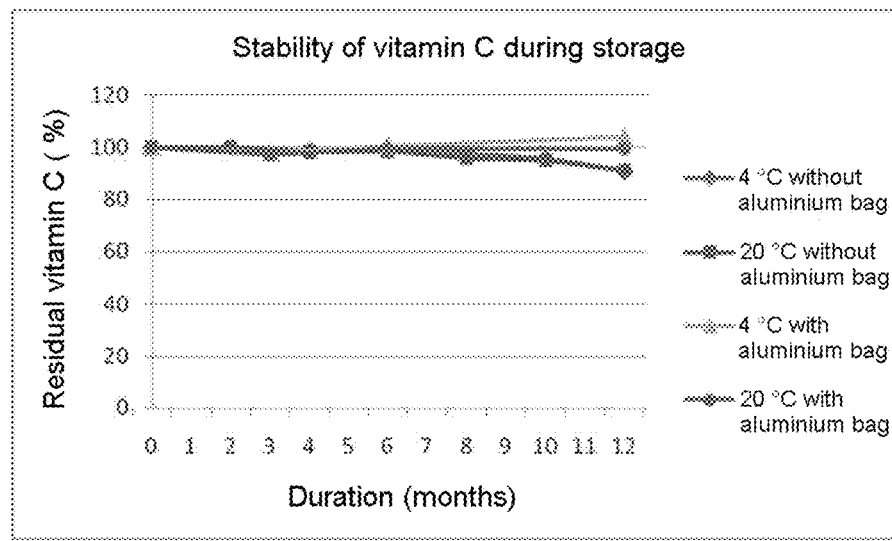
FIG. 1: Change in vitamin C content of the powder of the invention during storage at 4° C. or 20° C. in an aluminium bag or without an aluminium bag.

The powder is characterised by a vitamin C content of 36.7% by weight of the total weight of the powder, which is stable over time as shown by the ageing test applied to the powder (see FIG. 1).

The product has excellent solubility (absence of a pellet visible to the naked eye after dissolution of the powder at a concentration of 10% by weight of the total weight of the powder in water and then centrifugation at 10,000 g for 10 minutes) and the solution obtained is bright and clear.

ii. Effect of Magnesium Hydroxide Content in the Powder of the Invention

In order to illustrate the importance of magnesium hydroxide content in the powder of the invention, spray-drying tests were carried out with various levels of Mg(OH)2 (here, pilot-stage tests).

Figure 2:
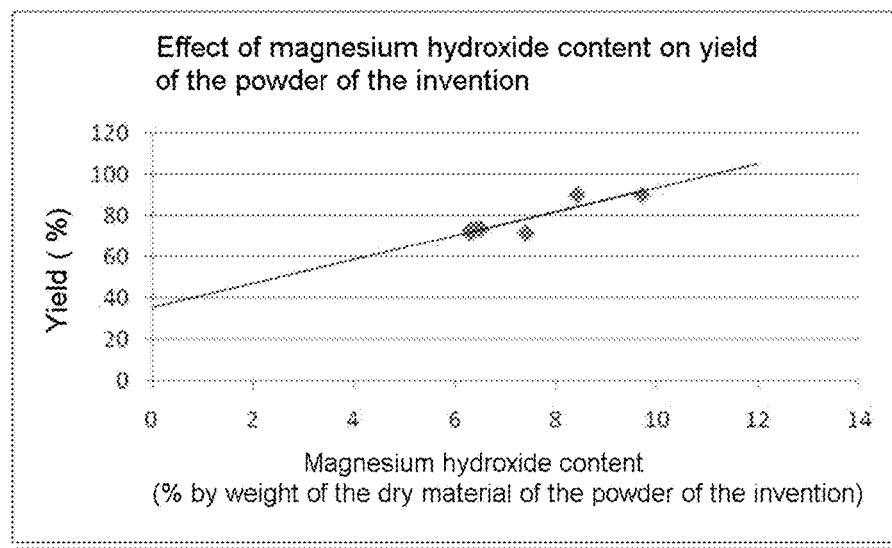
FIG. 2: Demonstration of the importance of magnesium hydroxide content on the yield of the powder of the invention.

As the graph in FIG. 2 proves, the yield of the powder of the invention decreases with decreasing amounts of magnesium hydroxide, reaching values below 65% (poor yield) with a magnesium hydroxide content of 5% by weight (content expressed relative to the dry material of the powder of the invention).

iii. Solubilisation Properties of a Powder of the Invention

In order to show the lower solubility of a freeze-dried acerola powder, solubilisation tests were performed on the sprayed powder of the invention compared with a freeze-dried powder. The results are presented below in Table 1:

TABLE 1

Solubilisation tests of acerola powders obtained by means of two different drying methods (spraying for the powder of the invention and freeze-drying)

| Sample (diluted to 10% in water) | Insoluble materials (%) |
|---|---|
| Acerola powder of the invention | 1.8 ± 0.3 |
| Freeze-dried acerola powder | 5.7 ± 0.1 |

These tests clearly show the lower solubility of the freeze-dried powder (quantification of insoluble materials presented in Table 1). About three times more insoluble compounds are generated from a 10% solution of freeze-dried powder. Furthermore, the appearance of a pellet visible to the naked eye is noted in the case of the test performed with the freeze-dried powder, which is not the case for the test performed with the powder of the invention.

This criterion may act to curb the use of the product in bright and clear products (beverages, for example). Furthermore, it may be assumed that in a freeze-dried powder characterised by many insoluble particles when in solution, vitamin C is less available and is less effective in terms of the effects attributed thereto (role as antioxidant, stabiliser, etc.). On the other hand, the spectrum of use of the powder of the invention (obtained by spraying) is not subject to this constraint.

Example 2—Antioxidant Potential of the Powder of Example 1 Versus Ascorbic Acid Tests performed in vitro illustrate the properties of the powder of the invention in comparison with the single effect of ascorbic acid. The table below shows that the powder of Example 1, in comparison with ascorbic acid, has a greater antiradical and antioxidant activity than that of equivalent concentrations of ascorbic acid.

TABLE 2

Evaluation of the antioxidant power of acerola powder versus ascorbic acid

| Method | Powder of the invention | Ascorbic acid |
|---|---|---|
| Antiradical activity (% of trapping of the free radical DPPH at the fixed | 90.1 | 70.6* |

TABLE 2-continued

Evaluation of the antioxidant power of acerola powder versus ascorbic acid

| Method | Powder of the invention | Ascorbic acid |
|---|---|---|
| concentration of 0.44 mg/ml ascorbic acid eq) | | |
| Overall antioxidant power (g/100 g of product in ascorbic acid eq) | 58 | 34 |

*Ascorbic acid tested in combination with Mg(OH)$_2$ in the proportions present in the powder of the invention.

Example 3—Effect of the Powder of the Invention on the Stabilisation of Red Pigments from Red Beet i. Proof of Stabilisation of Red Beet in a Cooked Meats Model The powder of Example 1 was tested in a food model as stabiliser of red beet pigments. It was incorporated into a red beet juice concentrate in a proportion of 40%, 10% and 4% (40 g, 10 g and 4 g of the powder of Example 1, respectively, added to 100 g of red beet concentrate of about 70° Brix and with about 0.6% to 0.7% of betanin and a pH of 4.44), these mixtures (the pH of which is not significantly different following addition of the powder of the invention taking into account the pH and the proportion of the powder of the invention used) themselves having been incorporated into an emulsion base used for the manufacture of fine-texture sausages. After heating for 20 minutes at 80° C., colour was measured using a L*a*b* system (Minolta CM5 spectrocolorimeter, D65 light source, 10° angle, reflection).

The table presented in FIG. 5 presents the results obtained according to six conditions: a negative control without dye, a test with the red beet concentrate alone, three tests with the red beet concentrate combined with the acerola powder of the invention in the various proportions listed above, and a positive control with carmine.

Delta E is an indicator for evaluating colour variation between a sample and a standard. It is calculated according to the following formula: $\Delta E = \sqrt{(a_{std}^* - a_{samp}^*)^2 + (b_{std}^* - b_{samp}^*)^2 + (L_{std}^* - L_{samp}^*)^2}$.

The standard chosen here corresponds to the condition with 0.01% carmine. A ΔE value (called "carmine delta E") below 4 corresponds to a product whose colour variation in comparison with the standard is considered to be acceptable.

The tests performed highlight the effect of the powder of the invention on the stabilisation of the red beet concentrate and in particular its potential to yield a heat-stable cooked meats product whose colour approaches a target prepared with carmine.

ii. Proof of Red Beet Stabilisation in a Cream Dessert Model

The powder of Example 1 was also tested for its ability to heat-stabilise red pigments from red beet in a cream pudding/dessert-type application. The acerola powder of the invention was incorporated into a red beet juice concentrate of about 70° Brix and with about 0.6% to 0.7% of betanin in a proportion of 66% (66 g of acerola powder at 34% vitamin C, added to 100 g of red beet juice concentrate), this mixture itself having been incorporated into a preparation containing water, milk, cream, sugar and texturisers heated at 90° C. for 10 minutes before being cooled. Absorbance at 540 nm was measured by means of a spectrocolorimeter in order to quantify betanin levels before and after heating, and the percentage loss of betanin was calculated from these data according to the following formula: [(A540 nm before heating−A540 nm after heating)/A540 nm before heating]× 100.

On the basis of the L*a*b* measurements (Minolta CM5 spectrocolorimeter, D65 light source, 10° angle, reflection), delta E also was calculated in order to evaluate colour variation in comparison with a standard before heating (called "heating delta E").

TABLE 4

Betanin loss and colour change in red beet juice concentrate stabilised or not by the product of the invention measured in a "cream dessert" food matrix

| Ingredient and proportion incorporated into the cream dessert | Betanin loss after heating (%) | Heating ΔE |
|---|---|---|
| 0.1% red beet concentrate | 29.3 | 18.5 |
| 0.06% red beet concentrate + 0.04% powder of the invention | 11.6 | 11.3 |

Figure 3:
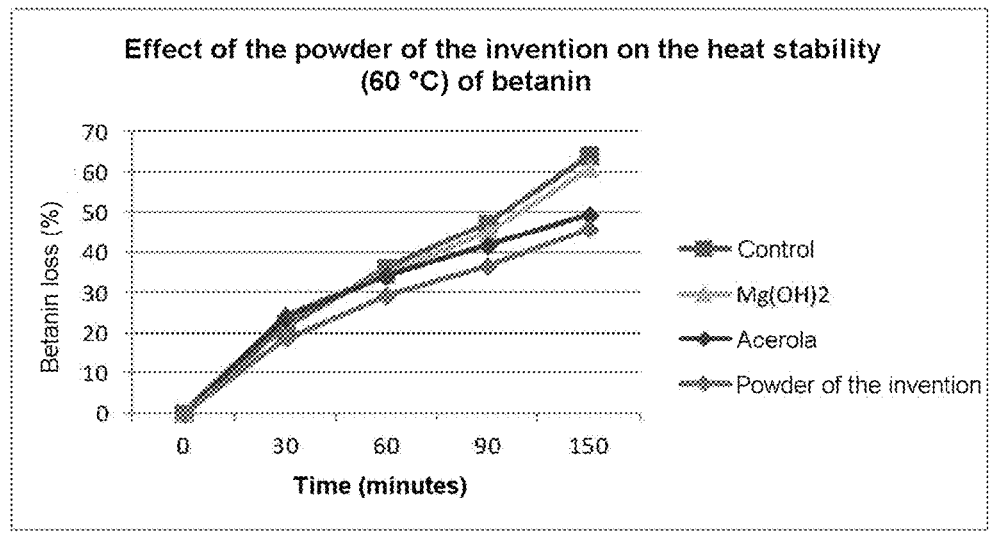
FIG. 3: Demonstration of the effect of the powder of the invention, of acerola extract alone (acerola juice concentrate, 50° Brix, diluted to 0.06%) and of magnesium hydroxide (Mg(OH)2 powder diluted to 0.002%) on the heat stability of betanin (red beet juice concentrate diluted to 0.2% in water).

These tests show that the fact of adding the powder of the invention to the red beet juice induces a red beet-pigment stabilisation effect, whatever indicator is considered (chemical, by means of percentage loss of betanin; or colorimetric, by means of heating delta E values).

iii. Effect of the Powder of the Invention, of Acerola Extract Alone and of Magnesium Hydroxide on Heat Stability of Betanin FIG. 3 shows the positive effect of acerola extract alone (not associated with magnesium hydroxide) and of the powder of Example 1, and the negligible effect of magnesium hydroxide, on the heat stability of betanin.

After 150 minutes of heating at 60° C. in an aqueous model:

Acerola provided in the form of a 50° Brix juice concentrate diluted to 0.06% reduces by 23% the betanin loss observed in a red beet concentrate diluted to 0.2% in water.

The powder of the invention reduces by 28% the betanin loss observed in a red beet concentrate diluted to 0.2% in water.

Magnesium hydroxide has a negligible contribution because it reduces by less than 5% the betanin loss observed in a red beet concentrate diluted to 0.2% in water.

This test clearly shows the specific effect of the powder of the invention, which does not result from a simple effect of addition of the effect of acerola alone and of the negligible effect of magnesium hydroxide (effect of the powder of the invention always superior to the effect of acerola alone added to the effect of Mg(OH)$_2$).

iv. Absence of Negative Effect at High Concentrations

Figure 4:
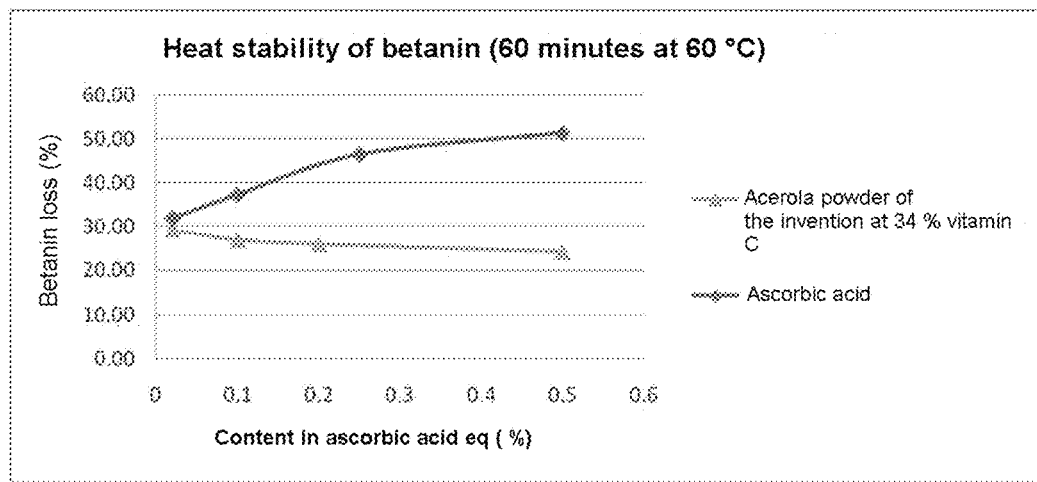
FIG. 4: Demonstration of betanin-degrading effect or absence of betanin-degrading effect in the presence of ascorbic acid or powder of the invention, respectively.

The graph in FIG. 4 shows that in an aqueous medium (dilution of red beet juice concentrate of about 70° Brix and with about 0.6% to 0.7% of betanin and of the acerola powder at 34% vitamin C of Example 1 in water, heating at 60° C. for 60 minutes and cooling), high concentrations of ascorbic acid induce greater levels of betanin loss than low concentrations. Conversely, if the powder of Example 1 is used to stabilise betanin, the stabilising effect increases as the concentration of acerola powder increases.

The powder of the invention thus prevents all the harmful effects of over-proportioning of ascorbic acid.

The invention claimed is:

1. A food additive or ingredient, comprising:
   a natural dye comprising one or more natural pigments; and
   a powder component consisting of:
      0.5% to 8% by weight of water, relative to the total weight of the powder component; and
      a dry material consisting of:
         88% to 95% by weight of an acerola fruit dry extract, relative to the total weight of the dry material; and
         5% to 12% by weight of a hydroxide or carbonate of magnesium, calcium, zinc, sodium or potassium, relative to the total weight of the dry material,
      wherein the acerola fruit dry extract provides the powder component with a natural vitamin C content of 30% to 40% by weight, relative to the total weight of the powder component.

2. The food additive or ingredient according to claim 1, wherein the natural dye comprises a red beet juice concentrate or a red beet powder.

3. A food or food composition comprising the food additive or ingredient according to claim 1 combined with a food component.

4. The food additive or ingredient according to claim 1, wherein the one or more natural pigments include betanin.

5. The food additive or ingredient according to claim 1, wherein the powder component contains a natural vitamin C content of 34%±3% by weight, relative to the total weight of the powder component.

6. The food additive or ingredient according to claim 1, wherein the powder component has a pH varying from 4 to 8.

7. The food additive or ingredient according to claim 1, wherein the powder component consists of 0.5% to 5% by weight of water, relative to the total weight of the powder component.

8. A method of producing a food additive or ingredient, the method comprising combining a powder component with a natural dye, the powder component consisting of:
   0.5% to 8% by weight of water, relative to the total weight of the powder component, and
   a dry material consisting of:
      88% to 95% by weight of an acerola fruit dry extract, relative to the total weight of the dry material; and
      5% to 12% by weight of a hydroxide or carbonate of magnesium, calcium, zinc, sodium or potassium, relative to the total weight of the dry material,
   wherein the acerola fruit dry extract provides the powder component with a natural vitamin C content of 30% to 40% by weight, relative to the total weight of the powder component,
   the natural dye comprising one or more natural pigments, the powder component stabilizing the natural dye.

9. The method according to claim 8, wherein the one or more natural pigments include betanin.

* * * * *